Patented Oct. 24, 1944

2,361,213

UNITED STATES PATENT OFFICE 2,361,213

PURIFICATION OF ROSIN AND ROSIN COMPOUNDS

William J. Kirkpatrick, Marshallton, Del., assignor to Hercules Powder Company, Wilmington, Del., a corporation of Delaware No Drawing. Application March 29, 1941, Serial No. 385,965

9 Claims. (Cl. 260—100)

This invention relates to the process of removing colloidal noble metal from compounds containing the hydrocarbon nucleus of a rosin acid, which compounds have been subjected to hydrogenation. For convenience, a compound containing the hydrocarbon nucleus of a rosin acid will hereinafter be referred to as a "rosinyl" compound. More particularly, this invention relates to removing colloidal noble metal from hydrogenated rosin and hydrogenated rosin esters.

The art is well-acquainted with the fact that the hydrogenation of rosin employing noble metal catalysts lacks commercial feasibility inasmuch as there is considerable catalyst loss in the process. Noble metal catalysts, when employed in the hydrogenation of rosin, have a tendency to become colloidal. The colloidal noble metal is carried along with the solution being hydrogenated and is retained by the hydrogenated rosin recovered therefrom. The colloidal noble metal in such solutions cannot be recovered by any simple and convenient methods such as filtering, settling, etc. Resort must be had to difficult and expensive methods of removal of the colloidal noble metal from the solution. The existence of this condition operates to defer the use of noble metals in rosin hydrogenation even though they present definite advantages over the presently used methods employing, for example, activated nickel-aluminum alloys.

Even where methods have been devised for preventing the formation of colloidal noble metal during hydrogenation, as disclosed in my copending application, Serial No. 387,662, filed April 9, 1941, an occasional batch of hydrogenated rosin is obtained which contains an intolerably high concentration of colloidal noble metal. In batch process hydrogenation, the likelihood is that the first batch of rosin hydrogenated with the catalyst will contain such an intolerably high concentration of noble metal. Also in continuous process hydrogenation the product first obtained will probably contain a high percentage of noble metal. Heretofore, it has been necessary to ash these hydrogenated rosins in order to recover the noble metal.

What has been said hereinbefore relative to rosin, has application in connection with the hydrogenation of any rosinyl compound.

It is hence an object of this invention to provide a method for the production of a hydrogenated rosinyl compound which is substantially free of noble metal.

It is a further object of this invention to provide a method for the recovery of colloidal noble metal from hydrogenated rosinyl compounds which contain intolerably large concentrations of noble metal.

Other objects of this invention will appear hereinafter.

These objects have been accomplished by treating the hydrogenated rosinyl compound, dissolved in a suitable water-immiscible solvent selected from the group consisting of the halogenated and non-halogenated hydrocarbons, with an activated carbon, thereafter removing the activated carbon and recovering the rosinyl compound from the solvent employed. By the use of this process, it is possible to remove colloidal noble metal from a rosinyl compound to the extent that the treated compound will contain less than 0.5 part per million of colloidal noble metal as determined by spectrographic analysis.

If batch process is used, several successive batches of rosinyl compound may be treated with the same quantity of activated carbon; or if continuous process is used, the same activated carbon can be used over an extended period of time. The actual ratio of activated carbon to rosinyl compound treated will be approximately 1 to 2000. After sufficient noble metal has accumulated to make recovery worthwhile, the activated carbon will be ashed, and the noble metal will be recovered from the ash by the usual methods known in the art.

Any hydrogenated rosinyl compound may be treated, in accordance with the processes of this invention, to remove the colloidal noble metal therefrom if said compound contains 0.5 or more parts per million of colloidal noble metal. The aforesaid rosinyl compounds may comprise both wood and gum rosin; the acids obtainable therefrom, such as, pimaric, sapinic, sylvic, abietic, etc.; esters of a rosin acid with a monohydric or polyhydric alcohol, such as, methyl abietate, ethyl abietate, glycerol abietate, pentaerythritol abietate, etc.; the alcohols produced by the reduction of the carboxyl group of a rosin acid, such as, abietyl alcohol, pimaryl alcohol, etc.; the esters of these alcohols, etc. The processes of this invention are particularly applicable to the removal of colloidal noble metal from hydrogenated rosin and from the esters of hydrogenated rosin.

The solvents which will be employed for the rosinyl compound will consist essentially of water-immiscible solvents. A solvent will be considered immiscible for the purposes of this invention if it will not tolerate more than 1.0% of dissolved water. The water-immiscible solvents which may be employed comprise hydrocarbons, such as, gasoline, mineral spirits, V. M. & P.

naphtha, benzene, pentane, hexane, cyclohexane, heptane, cycloheptane, octane, para-menthane, pinane, etc.; halogenated hydrocarbons, such as, carbon tetrachloride, ethylene dichloride, ethyl chloride, ethylene dibromide, acetylene tetrachloride, chloroform, bromoform, acetylene tetrabromide, methylene dichloride, methylene dibromide, etc. If desired, mixtures of any of the above solvents may be employed.

The activated carbon which will be employed in carrying out the processes of the invention will comprise any charcoal produced by the destructive distillation of vegetable matter or animal matter. Thus, vegetable charcoals obtained from woods, such as, pine, birch, logwood, quebracho, hemlock, cedar, etc., corn husks, cobs, corn stalks, cane trash, bagasse, peat, coals of various kinds, lignite, rice hulls, molasses, alcohol slop, waste liquors and extracts resulting from paper manufacture, ivory nut shavings, coconut hulls, peach nut shells, fruit kernels, vegetable oils, etc., may be used. Also animal charcoals, such as, those obtained from bones, blood, leather, etc., may be used. The particular carbon which is employed in the process may be activated by any of the methods known in the art prior to its use. Thus, for example, any charcoal activated by treatment with air, steam, or carbon dioxide at an elevated temperature may be employed. The commercial forms of activated charcoal known as Norit and Darco are particularly suitable for this application.

The activated carbon may be employed as such or it may be used in admixture with a gel, such as, alumina or silica gel, etc. When such an admixture is employed, the gel may be formed with the activated carbon particles suspended therein.

In accordance with the processes of this invention, a quantity of the desired rosinyl compound is dissolved in a water-immiscible solvent, such as, for example, gasoline. The amount of solvent used will vary, depending upon the particular rosinyl compound being treated, and it will be understood that the processes of this invention are not limited to the use of any particular amount. As a matter of practical convenience, however, the amount of solvent employed will generally vary between about 100% and about 1000% based on the rosinyl compound. To the resulting solution will be added between about 1% and about 10% of activated carbon, based on the rosinyl compound, however, it will be understood that a greater or lesser amount might possibly be employed. Preferably, between about 1% and about 2% of activated carbon will be used. The mixture will then be heated with agitation at a temperature within the range of from about 25° C. to the reflux temperature of the solution. Preferably, the mixture will be heated at reflux temperature. The length of the heating period will vary on the average between about 5 minutes and about 60 minutes, preferably between about 10 minutes and about 30 minutes. At the conclusion of the heating period, the carbon will be filtered from the solution and the hydrogenated rosinyl compound recovered in any suitable manner.

The method described hereinabove constitutes the basic procedure which will be employed to achieve the improved results of this invention. However, the preferred method of the invention involves several steps preliminary to the heating of the rosinyl compound in solution with the activated carbon as hereinabove described. These preliminary steps are important inasmuch as their use insures obtaining a product which is no darker in color than the original hydrogenated rosinyl compound. In accordance with this preferred procedure, the rosinyl compound is dissolved in a portion of the water-immiscible solvent and the solution heated at a temperature within the range of from about 25° C. and the reflux temperature of the solution, preferably at the reflux temperature. The solution will be heated for a period sufficiently long to remove any dissolved oxygen and this will take on the average from between about 5 minutes and about 30 minutes. The remainder of the water-immisicible solvent, together with the activated carbon, will be heated with agitation at a temperature within the range of from about 25° C. and the reflux temperature of the solvent, preferably at the reflux temperature of the solvent. The period of heating will be sufficiently long to remove any dissolved oxygen from the solvent and to remove any gases which may be occluded to the carbon. This period will be on the average between about 5 minutes and about 30 minutes. At the end of this period, the carbon-solvent mixture will be admixed with the rosinyl solution and the resulting mixture heated with agitation in accordance with the basic procedure hereinbefore disclosed. Desirably, the preliminary heating of the resinyl solution and also that of the carbon-solvent mixture will be carried out concurrently such that they may be admixed at the elevated temperatures at which they are being heated, thereby precluding any possible oxygen absorption.

It is also preferred that, during the preliminary heating of the carbon-solvent mixture, the mixture be blown with hydrogen to further activate the carbon. This treatment will be addition aid in displacing any dissolved oxygen from the solvent.

There follow several specific examples which illustrate particular embodiments of the processes of this invention. These examples, however, are in no way to be taken as limiting. All parts and percentages in the specification and claims are by weight unless otherwise indicated.

Example 1

One hundred parts of hydrogenated rosin, having a melting point by the drop method of 80° C., an acid number of 167 and containing 5.0 parts per million of colloidal platinum, were dissolved in 900 parts of hexane by heating under reflux. The heating was continued until the dissolved oxygen had been removed  This required about 20 minutes. Then 5 parts of Norit were refluxed with 100 parts of hexane for 30 minutes. Norit is an activated wood charcoal from birch wood. While the Norit-hexane mixture was being refluxed, the Norit was further activated by bubbling hydrogen through the mixture. Thereafter the hydrogenated rosin solution was added to the Norit-hexane mixture without admitting air to the apparatus. The resulting mixture was then heated under reflux for 30 minutes. At the end of this period, the mixture was filtered and the hydrogenated rosin recovered from the solvent by vacuum distillation. The hydrogenated rosin was poured at 145° C. A spectrographic analysis of the product showed that it contained less than 0.5 part per million of platinum.

Example 2

One hundred parts of tetrohydro rosin acids were separated from a hydrogenated rosin. The tetrahydro rosin acid material had a drop melting point of 171° C. and an acid number of 182. This material, containing platinum to the extent of 5.0 parts per million, was dissolved in 300 parts of carbon tetrachloride and the solution refluxed until the dissolved oxygen was entirely removed. This took approximately 30 minutes. 10 parts of Norit were concurrently refluxed with 100 parts of carbon tetrachloride over a period of 30 minutes. The Norit employed was the same as that utilized in Example 1. During the period of reflux of the Norit-carbon tetrachloride mixture, a slow stream of hydrogen was blown through the mixture to activate the Norit. The tetrahydro rosin acids solution and the Norit-carbon tetrachloride mixture were then combined and the resulting admixture heated under reflux for 30 minutes. The Norit was filtered out of the hot solution, and the tetrahydro rosin acids thereafter recovered by vacuum distillation of the filtrate. The product was poured at 190° C. A spectrographic analysis of the same showed that it contained less than 0.5 part per million of platinum.

*Example 3*

One hundred parts of a hydrogenated glycerol ester of rosin were dissolved in 900 parts of hexane by heating under reflux. The particular ester employed had a melting point by the drop method of 90° C., an acid number of 7, a refractive index of 1.5207 and contained 5.0 parts per million of colloidal platinum. The heating was continued until the dissolved oxygen had been substantially removed. The duration of the heating period was about 30 minutes. Thereafter, 5 parts of Norit were refluxed with 100 parts of hexane for 10 minutes. The Norit employed was the same as that utilized in Example 1. During the refluxing of the Norit-hexane, hydrogen gas was bubbled through the mixture for the purpose of activating the Norit. Then the solution containing the hydrogenated ester was added to the Norit-hexane mixture without admitting air to the apparatus. The resulting mixture was heated under reflux for 30 minutes. At the end of this period, the mixture was filtered and the hydrogenated ester recovered from the solvent by vacuum distillation. The hydrogenated ester was poured at 160° C. A spectrographic analysis showed that it contained less than 0.5 part per million of platinum.

By virtue of the improved methods of this invention, it is now possible to recover colloidal noble metal from hydrogenated rosinyl compounds in substantial quantities. Actually, the amount of noble metal remaining in rosinyl compounds after treatment in accordance with the disclosed processes is less than 0.5 part per million. This possible recovery of noble metal constitutes a real advance in the art of noble metal hydrogenation inasmuch as it removes one of the economic barriers heretofore existing in this field.

It will be understood that by the term "noble metal" as used in this specification and claims attached, there is contemplated a member of the group consisting of platinum, osmium, palladium, ruthenium, rhodium, and iridium.

It will be understood that the details and examples hereinbefore set forth are illustrative only and that the invention as broadly described and claimed is in no way limited thereby.

What I claim and desire to protect by Letters Patent is:

1. The process of removing a colloidal noble metal selected from the group consisting of platinum, osmium, palladium, ruthenium, rhodium and iridium from a hydrogenated rosinyl compound containing said metal which comprises the steps of heating said compound, dissolved in a water-immiscible solvent selected from the group consisting of hydrocarbons and halogenated hydrocarbons, at a temperature within the range of from about 25° C. to the reflux temperature of the solution, heating a mixture of an activated carbon with an additional quantity of said water-immiscible solvent, at a temperature within the range of from about 25° C. to the reflux temperature of the solvent while passing hydrogen through the mixture, then admixing the aforesaid solution with the aforesaid mixture and agitating the admixture at a temperature within the range of from about 25° C. to the reflux temperature of the admixture, separating the carbon, and recovering the hydrogenated rosinyl compound in any suitable manner.

2. The process of removing colloidal platinum from hydrogenated rosin containing said platinum which comprises the steps of heating said rosin, dissolved in gasoline, at the reflux temperature of the solution, heating a mixture of wood charcoal which has been activated by treatment with air at an elevated temperature and an additional quantity of gasoline at the reflux temperature of the gasoline while passing hydrogen through the mixture, then admixing the aforesaid solution with the aforesaid mixture and agitating the admixture at the reflux temperature of the admixture, separating the wood charcoal, and recovering the hydrogenated rosin.

3. The process of removing a colloidal noble metal selected from the group consisting of platinum, osmium, palladium, ruthenium, rhodium, and iridium from a hydrogenated rosinyl compound containing said metal which comprises the steps of heating said compound, dissolved in a water-immiscible hydrocarbon solvent at a temperature within the range of from about 25° C. to the reflux temperature of the solution, heating a mixture of an activated carbon with an additional quantity of said water-immiscible hydrocarbon solvent, at a temperature within the range of from about 25° C. to the reflux temperature of the solvent while passing hydrogen through the mixture, then admixing the aforesaid solution with the aforesaid mixture and agitating the admixture at a temperature within the range of from about 25° C. to the reflux temperature of the admixture, separating the carbon, and recovering the hydrogenated rosinyl compound in any suitable manner.

4. The process of removing a colloidal noble metal selected from the group consisting of platinum, osmium, palladium, ruthenium, rhodium, and iridium from a hydrogenated rosinyl compound containing said metal which comprises the steps of heating said compound, dissolved in a water-immiscible halogenated hydrocarbon solvent at a temperature within the range of from about 25° C. to the reflux temperature of the solution, heating a mixture of an activated carbon with an additional quantity of said water-immiscible halogenated hydrocarbon solvent, at a temperature within the range of from about 25° C. to the reflux temperature of the solvent while passing hydrogen through the mixture, then admixing the aforesaid solution with the aforesaid mixture and agitating the admixture at a temperature within the range of from about 25° C. to the reflux temperature of the admixture, separating the carbon, and recovering the hydrogenated rosinyl compound in any suitable manner.

5. The process of removing colloidal platinum from hydrogenated rosin containing said platinum which comprises the steps of heating said rosin, dissolved in a water-immiscible hydrocarbon solvent, at a temperature within the range of from about 25° C. to the reflux temperature of the solution, heating a mixture of an activated carbon with an additional quantity of said water-immiscible hydrocarbon solvent, at a temperature within the range of from about 25° C. to the reflux temperature of the solvent while passing hydrogen through the mixture, then admixing the aforesaid solution with the aforesaid mixture and agitating the admixture at a temperature within the range of from about 25° C. to the reflux temperature of the admixture, separating the carbon, and recovering the hydrogenated rosinyl compound in any suitable manner.

6. The process of removing colloidal platinum from hydrogenated rosin containing said platinum which comprises the steps of heating said rosin, dissolved in a water-immiscible halogenated hydrocarbon solvent, at a temperature within the range of from about 25° C. to the reflux temperature of the solution, heating a mixture of an activated carbon with an additional quantity of said water-immiscible halogenated hydrocarbon solvent, at a temperature within the range of from about 25° C. to the reflux temperature of the solvent while passing hydrogen through the mixture, then admixing the aforesaid solution with the aforesaid mixture and agitating the admixture at a temperature within the range of from about 25° C. to the reflux temperature of the admixture, separating the carbon, and recovering the hydrogenated rosinyl compound in any suitable manner.

7. The process of removing colloidal platinum from hydrogenated rosin containing said platinum which comprises the steps of heating said rosin, dissolved in gasoline, at the reflux temperature of the solution, heating a mixture of an activated carbon with an additional quantity of gasoline at the reflux temperature of the gasoline while passing hydrogen through the mixture, then admixing the aforesaid solution with the aforesaid mixture and agitating the admixture at the reflux temperature of the admixture, separating the carbon, and recovering the hydrogenated rosin.

8. The process of removing colloidal platinum from hydrogenated rosin containing said platinum which comprises the steps of heating said rosin, dissolved in benzene, at the reflux temperature of the solution, heating a mixture of an activated carbon with an additional quantity of benzene at the reflux temperature of the benzene while passing hydrogen through the mixture, then admixing the aforesaid solution with the aforesaid mixture and agitating the admixture at the reflux temperature of the admixture, separating the carbon, and recovering the hydrogenated rosin.

9. The process of removing colloidal platinum from hydrogenated rosin containing said platinum which comprises the steps of heating said rosin, dissolved in carbon tetrachloride, at the reflux temperature of the solution, heating a mixture of an activated carbon with an additional quantity of carbon tetrachloride at the reflux temperature of the carbon tetrachloride while passing hydrogen through the mixture, then admixing the aforesaid solution with the aforesaid mixture and agitating the admixture at the reflux temperature of the admixture, separating the carbon, and recovering the hydrogenated rosin.

WILLIAM J. KIRKPATRICK.